United States Patent
Bae et al.

(10) Patent No.: US 9,817,529 B2
(45) Date of Patent: Nov. 14, 2017

(54) FLEXIBLE TOUCH PANEL (71) Applicant: Samsung Display Co., Ltd., Yongin, Gyeonggi-Do (KR)

(72) Inventors: Joo-Han Bae, Seongnam-si (KR); Jin Hwan Kim, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/734,897

(22) Filed: Jun. 9, 2015

(65) Prior Publication Data
US 2016/0202827 A1    Jul. 14, 2016

(30) Foreign Application Priority Data

Jan. 9, 2015 (KR) .......................... 10-2015-0003499

(51) Int. Cl.
*G06F 3/044* (2006.01)

(52) U.S. Cl.
CPC .... *G06F 3/044* (2013.01); *G06F 2203/04102* (2013.01); *G06F 2203/04111* (2013.01); *G06F 2203/04112* (2013.01)

(58) Field of Classification Search
CPC .............. G06F 3/041; G06F 3/044; G06F 2203/04112; G06F 2203/04102; G06F 2203/04111; H05K 3/00
USPC .................. 345/173–174; 178/18.06; 349/12
See application file for complete search history.

(56) References Cited

U.S. PATENT DOCUMENTS

| | | | | |
|---|---|---|---|---|
| 2010/0073310 A1* | 3/2010 | Liang | ...................... | G06F 3/044 345/173 |
| 2011/0018838 A1* | 1/2011 | Lee | ...................... | G06F 3/044 345/174 |
| 2014/0015772 A1* | 1/2014 | Tung | ...................... | G06F 3/041 345/173 |
| 2014/0118292 A1* | 5/2014 | Kim | ...................... | G06F 3/044 345/174 |
| 2014/0168109 A1* | 6/2014 | Kang | ...................... | G06F 3/044 345/173 |
| 2014/0211102 A1* | 7/2014 | Kang | ...................... | G06F 3/041 349/12 |
| 2015/0109234 A1* | 4/2015 | Lotz | ...................... | H05K 3/00 345/174 |
| 2015/0241906 A1* | 8/2015 | Tsai | ...................... | G06F 3/044 345/173 |

FOREIGN PATENT DOCUMENTS

| | | |
|---|---|---|
| KR | 10-2011-0118411 A | 10/2011 |
| KR | 10-1077433 B1 | 10/2011 |
| KR | 10-2011-0121892 A | 11/2011 |
| KR | 10-2012-0029119 A | 3/2012 |

* cited by examiner

*Primary Examiner* — Nalini Mummalaneni
*Assistant Examiner* — James Nokham
(74) *Attorney, Agent, or Firm* — Knobbe, Martens, Olson & Bear LLP (57) ABSTRACT

Provided is a flexible touch panel, including: a flexible substrate; and a touch sensor unit positioned on the flexible substrate and including a transparent conductive oxide pattern and a transparent conductive polymer pattern which are stacked while being connected to each other.

7 Claims, 7 Drawing Sheets

FLEXIBLE TOUCH PANEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2015-0003499 filed in the Korean Intellectual Property Office on Jan. 9, 2015, the entire contents of which are incorporated herein by reference.

BACKGROUND

Field

This disclosure relates to a flexible touch panel, and more particularly, to a flexible touch panel including a flexible substrate which is flexible.

Description of the Related Technology

A touch panel is an apparatus which recognizes a touch by a pen or a user's finger and has been recently used as a means which is disposed on a display panel such as an organic light emitting diode display or a liquid crystal display to input a signal to a display device.

The touch panel includes a substrate and a touch sensor unit which is positioned on the substrate to recognize a touch.

Recent developments have shown that the substrate is formed in a flexible film which is flexible, and thus a flexible touch panel has been developed as a whole.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

The present disclosure has been made in an effort to provide a flexible touch panel having advantage of suppressing a delay of a signal while improving reliability of electrostatic discharge (ESD).

An exemplary embodiment provides a flexible touch panel, including: a flexible substrate; and a touch sensor unit positioned on the flexible substrate and including a transparent conductive oxide pattern and a transparent conductive polymer pattern which are stacked while being connected to each other.

The transparent conductive oxide pattern may have a mesh form.

The transparent conductive oxide pattern may include: a plurality of first mesh patterns positioned on the flexible substrate and each disposed to be spaced from each other in a first direction; a transparent bridge connecting between the plurality of first mesh patterns, respectively; and a plurality of second mesh patterns positioned on the flexible substrate and each disposed to be spaced from each other in a second direction intersecting the first direction.

The first mesh pattern, the transparent bridge, and the second mesh pattern may be positioned on the same layer.

The touch sensor unit may further include: an insulating layer which covers the plurality of first mesh patterns and the plurality of second mesh patterns and includes a contact hole through which the first mesh pattern and the second mesh pattern each are partially exposed.

The transparent conductive polymer pattern may include: a plurality of first conductive polymer patterns which are positioned on the insulating layer, each disposed to be spaced apart from each other in the first direction, and each contact the first mesh pattern through the contact hole; a plurality of second conductive polymer patterns which are positioned on the insulating layer, each are disposed to be spaced apart from each other in the second direction, and each contact the second mesh pattern through the contact hole; and a conductive polymer connection part connecting between the plurality of second conductive polymer patterns, respectively.

The first conductive polymer pattern, the second conductive polymer pattern, and the conductive polymer connection part may be positioned on the same layer.

The first conductive polymer pattern, the second conductive polymer pattern, and the conductive polymer connection part may be formed as a single layer and the transparent conductive polymer pattern may further include a non-conductive polymer pattern which is positioned between the first conductive polymer pattern and the conductive polymer connection part.

The transparent conductive oxide pattern may have an island form.

Another embodiment provides a flexible touch panel including: flexible substrate; a plurality of first mesh patterns positioned on the flexible substrate and each disposed to be spaced from each other in a first direction; a transparent bridge connecting between the plurality of first mesh patterns, respectively; and a plurality of second mesh patterns positioned on the flexible substrate and each disposed to be spaced from each other in a second direction intersecting the first direction; an insulating layer covering the plurality of first mesh patterns and the plurality of second mesh patterns and including a contact hole through which the first mesh pattern and the second mesh pattern each are partially exposed; a plurality of first conductive polymer patterns which are positioned on the insulating layer, each disposed to be spaced apart from each other in the first direction, and each contact the first mesh pattern through the contact hole; a plurality of second conductive polymer patterns which are positioned on the insulating layer, each are disposed to be spaced apart from each other in the second direction, and each contact the second mesh pattern through the contact hole; and a conductive polymer connection part connecting between the plurality of second conductive polymer patterns, respectively.

According to an embodiment, it is possible to provide the flexible touch panel capable of suppressing the delay of the signal while improving the reliability of the electrostatic discharge.

DETAILED DESCRIPTION

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. As used herein, the term "and/or" includes any and all combinations of one or more of the associated listed items.

Embodiments of the present disclosure will be described below in more detail with reference to the accompanying drawings. Those components that are the same or are in correspondence are rendered the same reference numeral regardless of the figure number, and redundant explanations are omitted.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

In the drawings, the thickness of layers, films, panels, regions, etc., are exaggerated for explanation. In other words, since sizes and thicknesses of components in the drawings are arbitrarily illustrated for convenience of explanation, the following embodiments are not limited thereto. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a flexible touch panel according to an exemplary embodiment will be described with reference to FIGS. 1 to 5.

Figure 1:
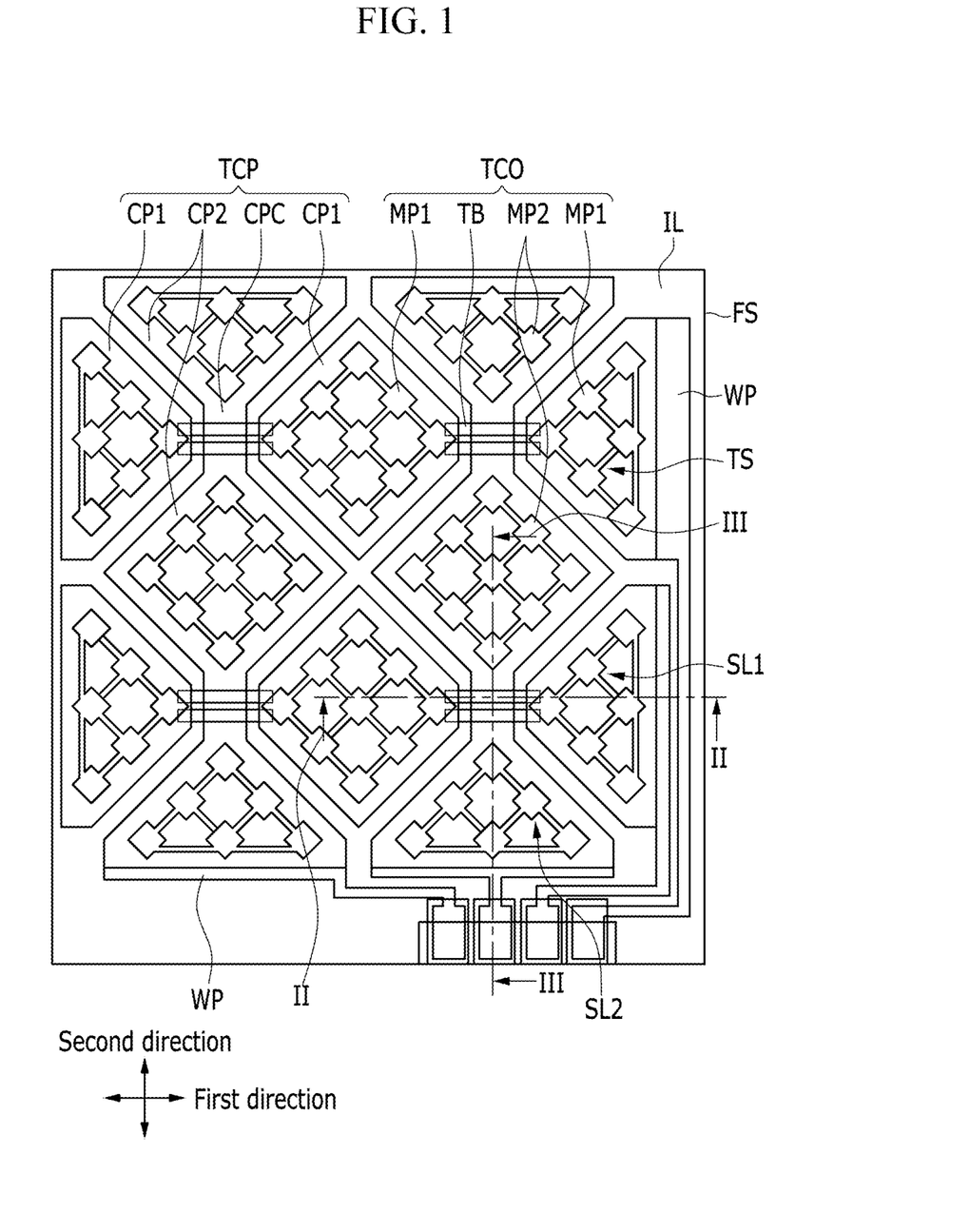
FIG. 1 is a plan view of a flexible touch panel according to an exemplary embodiment of the present invention.

FIG. 1 is a plan view of a flexible touch panel according to an exemplary embodiment.

As illustrated in FIG. 1, a flexible touch panel according to an exemplary embodiment recognizes a touch and includes a flexible substrate FS, a wiring part WP, and a touch sensor unit TS. The flexible touch panel may include a touch controller (not illustrated), in which the touch controller is formed in a form of a flexible printed circuit board (PCB), a printed circuit board (PCB), or the like and may be connected to the wiring part (WP). The touch controller digitizes an electrical analog signal transmitted from the flexible touch panel into a digital signal using a converter, and the like to enable a user to calculate touched location information.

The flexible substrate FS is flexible and may include a flexible film. The flexible substrate FS is an insulating substrate including polymer, glass, stainless steel, or the like. The flexible substrate FS may be flexible but is not limited thereto, and therefore stretchable, foldable, bendable, or rollable. The flexible substrate FS is flexible, stretchable, foldable, bendable, or rollable, such that the whole flexible touch panel may be flexible, stretchable, foldable, bendable, or rollable.

The wiring part WP is positioned in an outside region of the flexible substrate FS and is connected to the touch sensor unit TS. The wiring part WP may connect between the touch sensor unit TS and the touch controller and may include opaque conductive materials such as metal or transparent conductive materials. The wiring part WP may be formed on the flexible substrate FS using a different process from or the same process as the touch sensor unit TS.

The touch sensor unit (TS) is a portion which directly recognizes a touch and is transparently formed on the whole. The touch sensor unit TS is positioned on the flexible substrate FS and may be configured in a capacitive type.

The touch sensor unit TS includes a first signal line SL1 which extends in a first direction on the flexible substrate FS to be connected to the wiring part WP and a second signal line SL2 which extends in a second direction intersecting the first direction to be connected to the wiring WP.

The first signal line SL1 is in plural and the plurality of first signal lines SL1 each may sequentially be disposed in the second direction.

The second signal line SL2 is in plural and the plurality of second signal lines SL2 each may be sequentially disposed in the first direction.

The first signal line SL1 and the second signal line SL2 intersect each other and an insulating layer IL is positioned between the first signal line SL1 and the second signal line SL2 so that the first signal line SL1 and the second signal line SL2 intersect each other at a portion where the first signal line SL1 and the second signal line SL2 intersect each other. The insulating layer IL may be formed in a pattern form and may include inorganic materials or organic materials such as silicon oxide (SiOx), silicon nitride (SiNx), or the like.

In the configured flexible touch panel, when a voltage is sequentially applied to the plurality of first signal lines SL1 and the plurality of second signal lines SL2 and charge is filled in the first signal lines SL1 and the second signal lines SL2, respectively, if the first signal line SL1 or second signal line SL2 is touched, a capacitance of the touched first signal line SL1 or second signal line SL2 is changed, such that it may be confirmed which position is touched.

As described above, the first signal line SL1 and the second signal line SL2 each include a transparent conductive oxide pattern TCO and a transparent conductive polymer pattern TCP. That is, the touch sensor unit TS includes the transparent conductive oxide pattern TCO, the insulating layer IL, the transparent conductive polymer pattern TCP, and hereinafter, the transparent conductive oxide pattern TCO, the insulating layer IL, the transparent conductive polymer pattern TCP each will be described in detail.

Figure 2:
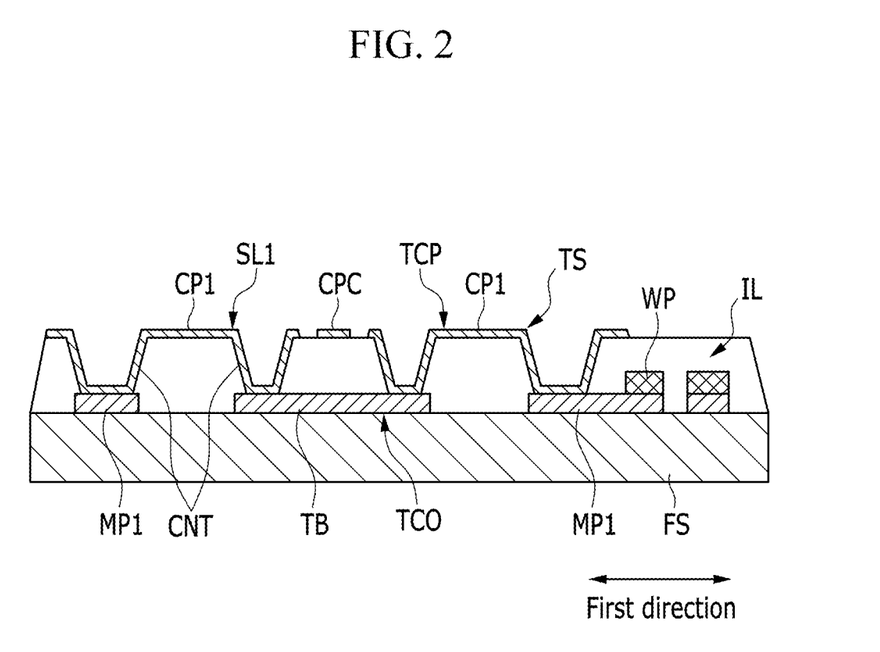
FIG. 2 is a cross-sectional view taken along the line II-II of FIG. 1.
Figure 3:
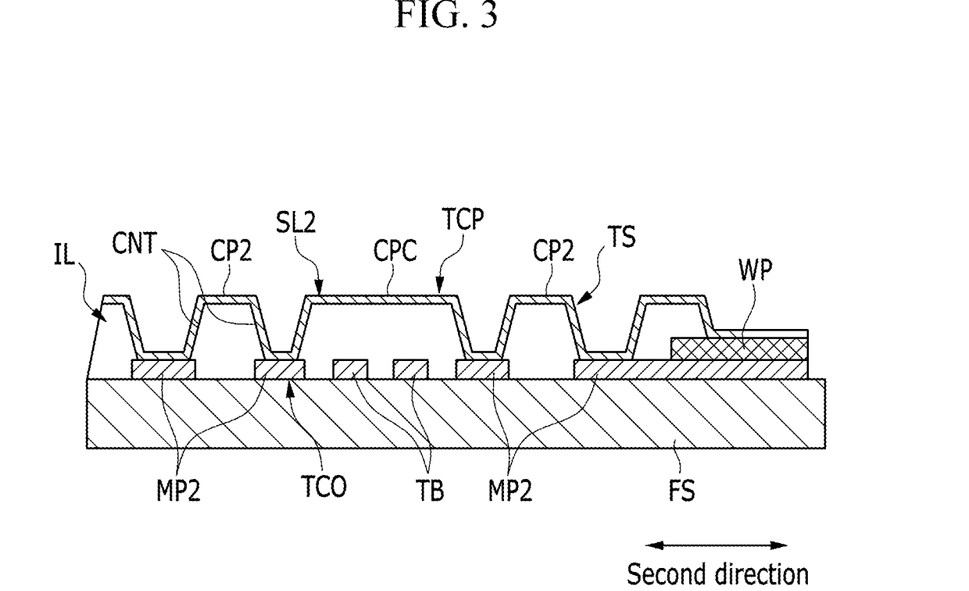
FIG. 3 is a cross-sectional view taken along line III-III of FIG. 1.

FIG. 2 is a cross-sectional view taken along the line II-II of FIG. 1. FIG. 3 is a cross-sectional view taken along line III-III of FIG. 1.

As illustrated in FIGS. 1 to 3, the transparent conductive oxide pattern TCO is positioned on the flexible substrate FS and has a mesh form. The transparent conductive oxide pattern TCO includes the transparent conductive oxide such as indium zinc oxide (IZO), indium tin oxide (ITO), tin oxide (SnOx), and zinc oxide (ZnOx). The transparent conductive oxide pattern TCO includes a refractive index similar to that of the flexible FS, and thus the transparent conductive oxide pattern TCO is suppressed from being visualized from the outside. The transparent conductive oxide pattern TCO includes a first mesh pattern MP1, a transparent bridge TB, and a second mesh pattern MP2.

The first mesh pattern MP1 has a mesh form and if the first mesh pattern MP1 has a mesh form, the first mesh pattern may also include any form of openings. The first mesh pattern MP1 is in plural and the plurality of first mesh patterns MP1 are each disposed to be spaced apart from each other in the first direction. A transparent bridge TB is connected between the adjacent first mesh patterns MP1, respectively.

The transparent bridge TB connects between the adjacent first mesh patterns MP1, respectively. The transparent bridge (TB) may be integrally formed with the first mesh pattern MP1 but is not limited thereto and may be formed in a form in which the transparent bridge TB is connected to the first mesh pattern MP1. The transparent bridge TB has a form extending in the first direction. The flexible substrate FS may be bent in the second direction and the transparent bridge TB having an aspect ratio extends in the first direction, such that when the flexible substrate FS is bent, the transparent bridge TB is suppressed from being damaged due to stress applied to the transparent bridge TB. The transparent bridge TB is in plural and the plurality of transparent bridges TBs connect between the adjacent first mesh patterns MP1, such that when the flexible substrate FS is bent, the transparent bridge TB is suppressed from being damaged due to the stress applied to the transparent bridge TB.

The second mesh pattern MP2 has a mesh form and if the first mesh pattern MP1 has a mesh form, the first mesh pattern may also include any form of openings. The second mesh pattern MP2 is in plural and the plurality of second mesh patterns MP2 are each disposed to be spaced from each other in the second direction. The first mesh pattern MP1, the transparent bridge TB, and the second mesh pattern MP2 are positioned on the same layer and include the same material and may be simultaneously formed on a surface of the flexible substrate FS by a one process.

Figure 4:
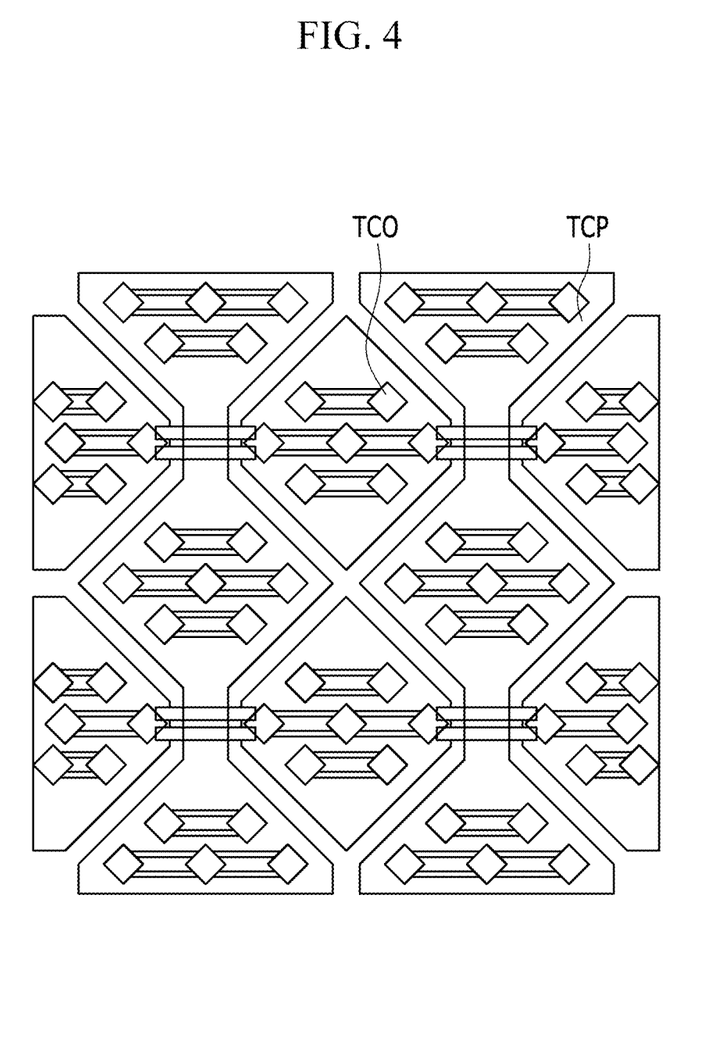
FIG. 4 is a plan view illustrating an example of a transparent conductive oxide pattern of the flexible touch panel according to the exemplary embodiment of the present invention.
Figure 5:
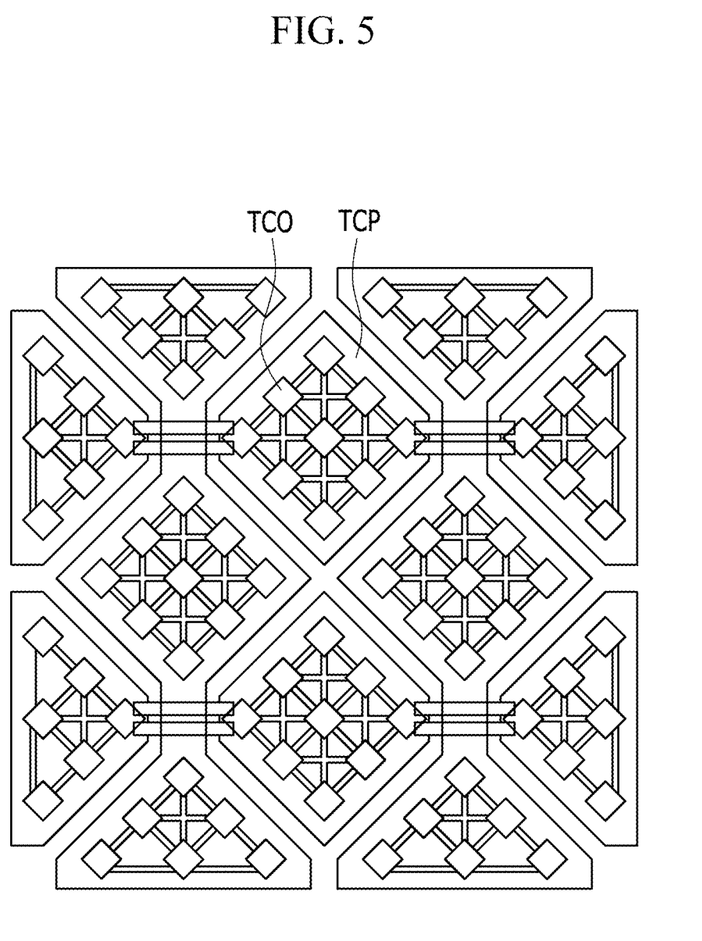
FIG. 5 is a plan view illustrating another example of a transparent conductive oxide pattern of the flexible touch panel according to the exemplary embodiment of the present invention.

FIG. 4 is a plan view illustrating an example of a transparent conductive oxide pattern of the flexible touch panel according to the exemplary embodiment. FIG. 5 is a plan view illustrating another example of a transparent conductive oxide pattern of the flexible touch panel according to another exemplary embodiment.

As illustrated in FIGS. 4 and 5, the transparent conductive oxide pattern TCO may have various mesh forms in two dimensions and has an island form. The transparent conductive oxide pattern TCO may have various forms such as a fixed shape and a non-fixed shape, if necessary.

Again, as illustrated in FIGS. 1 to 3, the insulating layer IL is positioned on the foregoing transparent conductive oxide pattern TCO.

The insulating layer IL covers the transparent conductive oxide pattern TCO and includes a plurality of contact holes CNTs through which a portion of the first mesh pattern MP1 and the second mesh pattern, respectively, is exposed. The insulating layer (IL) covers the plurality of first mesh patterns MP1, the plurality of second mesh patterns MP2, the plurality of transparent bridges TBs, respectively, and the plurality of contact holes CNTs each have the first mesh pattern MP1 and the second mesh pattern MP2, respectively, partially exposed there through. The plurality of contact holes CNTs each may be positioned corresponding to a portion having an area wider than those of other portions among the patterns in the mesh form which is formed by the first mesh pattern MP1 and the second mesh pattern MP2, respectively.

The transparent conductive polymer pattern TCP is positioned on the insulating layer IL.

The transparent conductive polymer pattern TCP is positioned on the transparent conductive oxide pattern TCO, having the insulating layer IL disposed therebetween and has a matrix form. The transparent conductive polymer pattern TCP includes PEDOT:PSS (poly(3,4-ethylenedioxythiophene)polystyrene sulfonate) but is not limited thereto and may further include polyethylene glycol (PEG) and poly ethylene oxide (PEO)

The transparent conductive polymer pattern (TCP) includes a first conductive polymer pattern CP1, a second conductive polymer pattern CP2, and a conductive polymer connection part CPC.

The first conductive polymer pattern CP1 is disposed on the insulating layer IL. The first conductive polymer pattern CP1 is in plural and the plurality of first conductive polymer patterns CP1 are each disposed to be spaced from each other in the first direction. The plurality of first conductive polymer patterns CP1 each contact the first mesh pattern MP1 through the contact hole CNT of the insulating layer IL.

The first conductive polymer pattern CP1 contacts the first mesh pattern MP1 by the contact hole CNT and the transparent bridge TB connects between the adjacent first mesh patterns MP1, such that the first conductive polymer pattern CP1, the first mesh pattern MP1, and the transparent bridge TB which are disposed in the first direction may configure the first signal line SL1 extending in the first direction.

The second conductive polymer pattern CP2 is disposed on the insulating layer IL. The second conductive polymer pattern CP2 is in plural and the plurality of second conductive polymer patterns CP2 are each disposed to be spaced from each other in the second direction. The plurality of second conductive polymer patterns CP2 each contact the second mesh pattern MP2 through the contact hole CNT of the insulating layer IL.

The conductive polymer connection part CPC connects between the adjacent second conductive polymer patterns CP2, respectively, among the plurality of second conductive polymer patterns CP2. The conductive polymer connection part CPC and the second conductive polymer pattern CP2 are integrally formed but are not limited thereto and may be formed as different portions.

The second conductive polymer pattern CP2 contacts the second mesh pattern MP2 by the contact hole CNT and the conductive polymer connection part CPC connects between the adjacent second conductive polymer patterns CP2, such that the second conductive polymer pattern CP2, the second mesh pattern MP2, and the conductive polymer connection part CPC may configure the second signal line SL2 extending in the second direction.

The first conductive polymer pattern CP1, the second conductive polymer pattern CP2, and the conductive polymer connection part CPC are positioned on the same layer and include the same material and may be simultaneously formed on the surface of the insulating layer IL by a one-time process.

As described above, in the flexible touch panel according to the exemplary embodiment, the touch sensor unit TS including the transparent conductive oxide pattern TCO and the transparent conductive polymer pattern TCP in the mesh form is formed on the flexible substrate FS, thereby improving the flexibility of the flexible touch panel as a whole.

Further, in the flexible touch panel according to the exemplary embodiment, the touch sensor unit TS is formed as a laminate of the transparent conductive oxide pattern TCO and the transparent conductive polymer pattern TC, such that even though unintended static electricity is generated in the transparent conductive polymer pattern TCP, static electricity may be dispersed by the transparent conductive oxide pattern TCO. Therefore, the flexible touch panel having the improved electrostatic discharge (ESD) provides reliability.

Further, in the flexible touch panel according to the exemplary embodiment, the touch sensor unit TS is formed as the laminate of the transparent conductive oxide pattern TCO and the transparent conductive polymer pattern TCP, and thus the electrical resistance of the touch sensor unit TS itself deteriorates, thereby suppressing the delay of the signal through the touch sensor unit TS. Thus, it provides the flexible touch panel in which the delay of the signal is suppressed.

Hereinafter, the flexible touch panel according to another exemplary embodiment will be described with reference to FIGS. 6 and 7. Hereinafter, components different from those of the flexible touch panel according to the exemplary embodiment of the present invention described above will be described.

Figure 6:
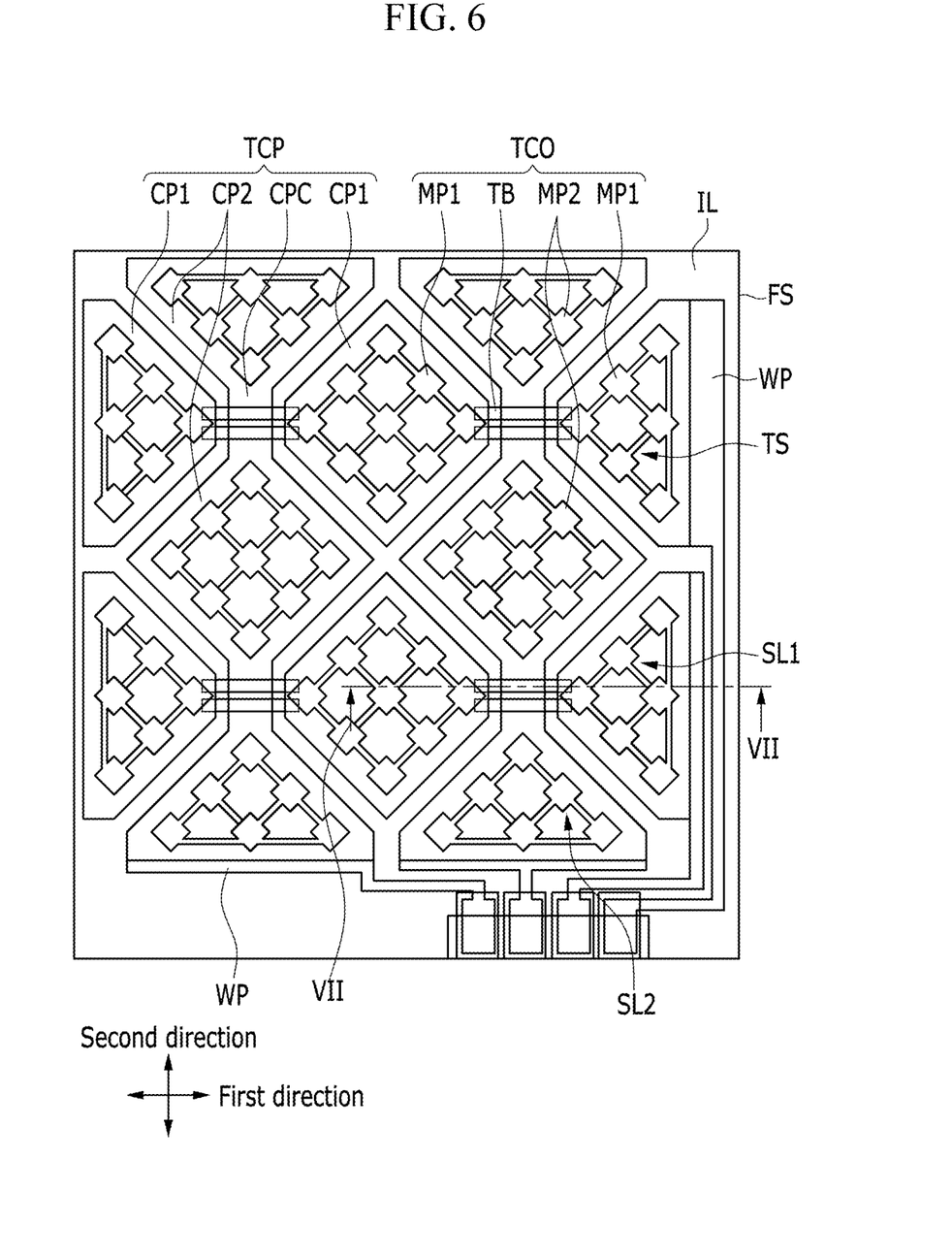
FIG. 6 is a plan view of a flexible touch panel according to another exemplary embodiment of the present invention.

FIG. 6 is a plan view of a flexible touch panel according to another exemplary embodiment of the present invention. FIG. 7 is a cross-sectional view taken along line VII-VII of FIG. 6.

Figure 7:
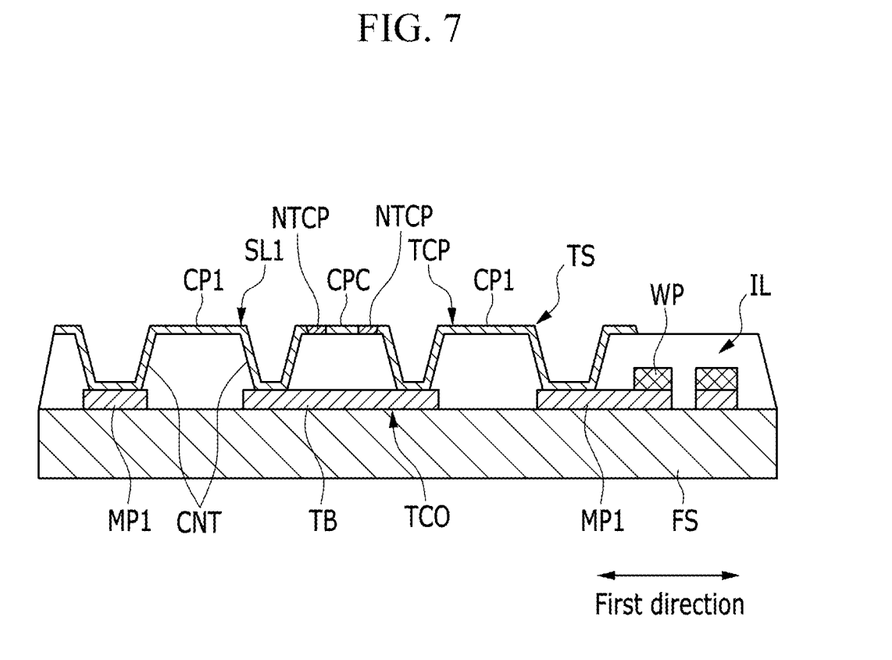
FIG. 7 is a cross-sectional view taken along line VII-VII of FIG. 6.

As illustrated in FIGS. 6 and 7, the flexible touch panel according to another exemplary embodiment, the transparent conductive polymer pattern TCP includes the first conductive polymer pattern CP1, the second conductive polymer pattern CP2, the conductive polymer connection part CPC, and a non-conductive polymer pattern NTCP.

The first conductive polymer pattern CP1, the second conductive polymer pattern CP2, the conductive polymer connection part CPC, the non-conductive polymer pattern NTCP is formed as a single layer, and the first conductive polymer pattern CP1, the second conductive polymer pattern CP2, and the conductive polymer connection part CPC are connected to one another.

The conductive polymer layer may be formed while losing conductivity by using a solution or light in one region formed of the non-conductive polymer pattern NTCP in the non-conductive polymer pattern NTCP formed as the single layer and the process may be performed by known various methods.

As described above, in the flexible touch panel according to another exemplary embodiment, the touch sensor unit TS including the transparent conductive oxide pattern TCO and the transparent conductive polymer pattern TCP in the mesh form is formed on the flexible substrate FS, thereby improving the flexibility of the flexible touch panel as a whole.

Further, in the flexible touch panel according to another exemplary embodiment, the touch sensor unit TS is formed as a laminate of the transparent conductive oxide pattern TCO and the transparent conductive polymer pattern TC, such that even though the unintended static electricity is generated in the transparent conductive polymer pattern TCP, the static electricity may be dispersed by the transparent conductive oxide pattern TCO. Therefore, the flexible touch panel having the improved electrostatic discharge (ESD) reliability is provided.

Further, in the flexible touch panel according to another exemplary embodiment, the touch sensor unit TS is formed as the laminate of the transparent conductive oxide pattern TCO and the transparent conductive polymer pattern TCP, and thus the electrical resistance of the touch sensor unit TS itself deteriorates, thereby suppressing the delay of the signal through the touch sensor unit TS. Thus, it provides the flexible touch panel wherein the delay of the signal is suppressed.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:
1. A flexible touch panel, comprising:
a flexible substrate; and
a touch sensor unit positioned on the same flexible substrate and including a transparent conductive oxide pattern and a transparent conductive polymer pattern which are stacked while being connected to each other,
wherein the touch sensor unit, the transparent conductive oxide pattern, and the transparent conductive polymer pattern are positioned on the same flexible substrate,
wherein the transparent conductive oxide pattern includes:
a plurality of first mesh patterns positioned on the flexible substrate and each disposed to be spaced from each other in a first direction;
a transparent bridge connecting between the plurality of first mesh patterns, respectively; and
a plurality of second mesh patterns positioned on the flexible substrate and each disposed to be spaced from each other in a second direction intersecting the first direction,
wherein the touch sensor unit further includes an insulating layer which covers the plurality of first mesh patterns and the plurality of second mesh patterns and includes a contact hole through which the first mesh pattern and the second mesh pattern each are partially exposed,
wherein the transparent conductive polymer pattern includes:
a plurality of first conductive polymer patterns which are positioned on the insulating layer, each disposed to be spaced apart from each other in the first direction, and each contact the first mesh pattern through the contact hole;
a plurality of second conductive polymer patterns which are positioned on the insulating layer, each are disposed to be spaced apart from each other in the second direction, and each contact the second mesh pattern through the contact hole; and
a conductive polymer connection part connecting between the plurality of second conductive polymer patterns, respectively.
2. The flexible touch panel of claim 1, wherein: the transparent conductive oxide pattern has a mesh form.

3. The flexible touch panel of claim 1, wherein:
the plurality of first mesh patterns, the transparent bridge, and the plurality of second mesh patterns are positioned on the same layer.

4. The flexible touch panel of claim 1, wherein:
the first conductive polymer pattern, the second conductive polymer pattern, and the conductive polymer connection part are positioned on the same layer.

5. The flexible touch panel of claim 1, wherein:
the first conductive polymer pattern, the second conductive polymer pattern, and the conductive polymer connection part are formed as a single layer, and
the transparent conductive polymer pattern further includes
a non-conductive polymer pattern which is positioned between the first conductive polymer pattern and the conductive polymer connection part.

6. The flexible touch panel of claim 1, wherein:
the transparent conductive oxide pattern has an island form.

7. A flexible touch panel, comprising:
a flexible substrate;
a plurality of first mesh patterns positioned on the same flexible substrate and each disposed to be spaced from each other in a first direction;
a transparent bridge connecting between the plurality of first mesh patterns, respectively; and
a plurality of second mesh patterns positioned on the same flexible substrate and each disposed to be spaced from each other in a second direction intersecting the first direction;
an insulating layer covering the plurality of first mesh patterns and the plurality of second mesh patterns and including a contact hole through which the first mesh pattern and the second mesh pattern each are partially exposed;
a plurality of first conductive polymer patterns which are positioned on the insulating layer, each disposed to be spaced apart from each other in the first direction, and each contact the first mesh pattern through the contact hole;
a plurality of second conductive polymer patterns which are positioned on the insulating layer, each are disposed to be spaced apart from each other in the second direction, and each contact the second mesh pattern through the contact hole; and
a conductive polymer connection part connecting between the plurality of second conductive polymer patterns, respectively.

\* \* \* \* \*